United States Patent [19]
Humphrey

[11] 3,756,686
[45] Sept. 4, 1973

[54] SERVO-INTEGRATING STABILIZER

[75] Inventor: William E. Humphrey, Oakland, Calif.

[73] Assignee: Optical Research and Development Corporation, Oakland, Calif.

[22] Filed: Sept. 8, 1971

[21] Appl. No.: 178,672

[52] U.S. Cl.................................. 350/16, 250/201
[51] Int. Cl. .......................................... G02b 23/00
[58] Field of Search...................... 350/16; 250/201, 250/213, 214; 356/141, 148, 149, 248, 250; 33/204 D, 224

[56] References Cited
UNITED STATES PATENTS

| | | | |
|---|---|---|---|
| 3,500,050 | 3/1970 | Hillman | 250/214 |
| 3,651,325 | 3/1972 | Alpers | 350/16 |
| 3,544,796 | 12/1970 | Baker | 250/201 |
| 3,518,016 | 6/1970 | Burdin et al. | 356/248 |
| 2,479,309 | 8/1949 | Cave-Browne-Cave | 250/201 |
| 3,532,409 | 10/1970 | Humphrey | 350/16 |

*Primary Examiner*—David H. Rubin
*Attorney*—Townsend & Townsend

[57] ABSTRACT

In an optic stabilizer having case mounted optic elements and a complementary and movable optical element for stabilizing an image, an apparatus for imparting improved stabilizing motion to the moving optical element is disclosed. The movable optical element, typically a mirror, is mounted for two degrees of motion relative to a neutral position along the optic axis. A variable torque field, typically magnetic, is provided to pass through the optical element and to urge the optical element back to its neutral position. By the expedient of providing a sensor for detecting misaligned positions of the movable optical element and integrating on a time average basis the misaligned position of the movable element, the magnitude and polarity of the variable torque field can be controlled to provide improved stabilizing motion of the movable optical element.

16 Claims, 5 Drawing Figures

FIG_3

FIG_4

INVENTOR.
WILLIAM E. HUMPHREY
BY
Townsend and Townsend
ATTORNEYS

SERVO-INTEGRATING STABILIZER

This invention relates to optical stabilizers so that optical instruments of high power can be stabilized against image vibration when subjected to instrument vibration from accidental angular motion along angular coordinates orthogonal to the optic axis. More particularly, this invention relates to a method and apparatus for providing time averaged stabilizing motion to a movable optical element having two degrees of freedom relative to an optic axis.

Hand held optical instruments of high power cannot be used when subjected to accidental angular motion. Such instruments often receive such ambient accidental angular motion from the tremulation of the human hand. This ambient accidental angular motion causes an image motion interior of the instrument directly proportional to the increased power or focal length of the instrument. Hence, the magnified image, because of its motion, cannot be observed or accurately recorded.

Optical stabilizers correct these problems. These optical stabilizers have typically included two sets of optics. First, case mounted optical elements are mounted to the case and move with the case. Second, movable optical elements are stabilized with reference to space either by remaining stationary with respect to a spatial reference or by moving proportionately with respect to a spatial reference. The combined effect of the movable optic elements and case fixed optic elements are chosen to produce image motion equal and opposite to the image motion produced by the accidental angular motion. Image stabilization results.

The movable optical elements have heretofore been mounted in fluid baths and typically coupled to the case by a small spring force--such as that provided by a magnet or elastic band. The spring and fluid bath combine to provide space referenced connection when the instrument is subjected to the relatively high frequency vibrations of small accidental angular motion and yet permit panning of the instrument when the instrument is subjected to low frequency angular movement.

The prior art method of controlling the movable optical elements to permit their stabilized motion has been limited. Typically, these limitations have arisen from the necessity of keeping the spring constant of the spring force as small as possible, yet large enough to mask spurious torques introduced into the system. These spurious torques have heretofore been generated by variations of environmental conditions of the instrument and the construction imbalances of the instrument. Such variations and imbalances produce misalignment of the movable optic elements both in stationary positions and when the movable elements are in motion.

These spurious torques can be easily understood. For example if a mirror is used as the movable optic element and supported with neutral bouyancy in a fluid, a small offset of the center of floatation of the mirror and the center of gravity of the mirror will result in a gravity reference pendulous motion of the mirror which decenters the optical system and degrades the optical performance. Moreover, if the optical instrument is used on a cold day then the warmth of the human hand can generate in the supporting fluid bath thermal flow of fluids, changes in viscosity, and changes in fluid density. Mirror movement will vary. Additionally, if the spring force is applied by external magnet field of relatively low strength, ambient fields can upset the positioning of the mirror.

An object of this invention is to provide a restoring torque for a movable optic element which varies in proportion to the time averaged angular displacement of the movable optic element with respect to optic instruments. Typically, sensors detect the misalignment of the optic element. These sensors provide outputs to an integrator which through amplification provides a time average restoring torque, typically through magnetic fields, to the misaligned optical element.

An advantage of this invention is that a relatively high spring constant is no longer required to mask spurious torques due to pendulous mirror imbalance, thermal fluid flow, change of fluid viscosity, change of fluid density, or even the presence of external magnetic fields.

Another advantage of this invention is that it can be used to align a mirror, a telescope, or other moving optical elements in a stabilized optical train.

A further advantage of this invention is that a correctional torque is applied to the moving optical element at conditions of imbalance only. When the mirror is aligned, torque need not be applied.

Still another advantage of this invention is that the spring constant for correcting the movable optic element to a neutral position can be relatively low. The movable optical element can be stabilized for instruments of increasingly higher power. Improvement of stabilized optic element response to instrument motion over conventional spring-fluid systems increases through reduction of the effective restoring force by a factor of as much as 60.

Yet another advantage of this system is that the optical element can be mounted in a transparent fluid bath. It can be provided with buoyant neutral support as well as a high shock resistant mounting.

Yet another object of this invention is to combine with the time average controlled movement of the mirror, an analog of a spring constant for keeping the mirror centered and a velocity factor to influence damping of the mirror movement responsive to instrument panning.

An advantage of these analogs is that they can be adjusted for changed mechanical operating conditions interior of the instrument. For example, when the thermal environment of the instrument has changed the viscosity of the fluid in the bath, adjustment of the analog can compensate for such a changed condition.

Yet another object of controlling the movement of the movable optic element is to provide a torque system which will not load the bearings holding the movable optic element on the optic axis. Thus angular movement of the movable optic element will not be accompanied by increasing bearing load.

An advantage of this magnetic field is that the mechanical and electrical components for holding the moving optical element on the optic axis can be minimized.

Still another object of this invention is to provide a read-out of the misalignment of the movable optical element with reference to case orientation at any given instant in time.

An advantage of this aspect of the invention is that if the case fixed optical elements are bore sighted (as in a gun sight application), the moving optics can be referenced to the bore sight. An optically stabilized gun sight mounted on an unstable platform (such as a tank) is feasible.

An advantage of this invention is that virtually any detector, such a an infra-red detector which comprises an optical element can be centered with respect to a bore sight.

Yet another object of this invention is to provide a loaded tank circuit, metal detector to determine misalignment of the mirror. According to this aspect, the field displacement of a small disc of metal mounted to the back of a mirror is sensed by a metal detector.

Yet another object of this invention is to provide for a light sensitive array to detect misalignment of the mirror. According to this aspect of the invention, a mirror is mounted on the back surface of the optical element. Light is impinged on the mirror and reflected to sensors. These sensors detect the misalignment of the mirror.

An advantage of this light sensitive displacement detector is that the light detectors can be placed in a bridge circuit. Misalignment of the mirror results in electrical currents of reversible polarity. These outputs thus can by their polarity indicate the direction of movement and by their intensity the amount of movement.

Yet another object of this light sensitive displacement detector is that it is insensitive to external magnetic or electrical fields. The detector is sensitive only to light which can be easily screened from effecting the device by the use of opaque materials. Additionally, optical filtering of the light array can be used to discriminate against ambient light present in the instrument.

Yet another object of this invention is to provide for an adjusted neutral position of an optical element without the consumption of electrical power.

An advantage of this neutral positioning is that long battery life can be provided to a portable hand held instrument.

An additional object of this invention is to provide for mechanical torquing of the movable optic element.

An advantage of this mechanical torquing of the optic element is that the position of the mirror can be independent of magnetic and electrical fields.

Still another object of this invention is to set forth a group of factors for controlling the integration factor, spring constant, and velocity factor in a fluid immersed instrument so that stable operation of the device will occur.

Other objects, features and advantages of this invention will become more apparent after referring to the following specification and drawings, in which.

Figure 1:
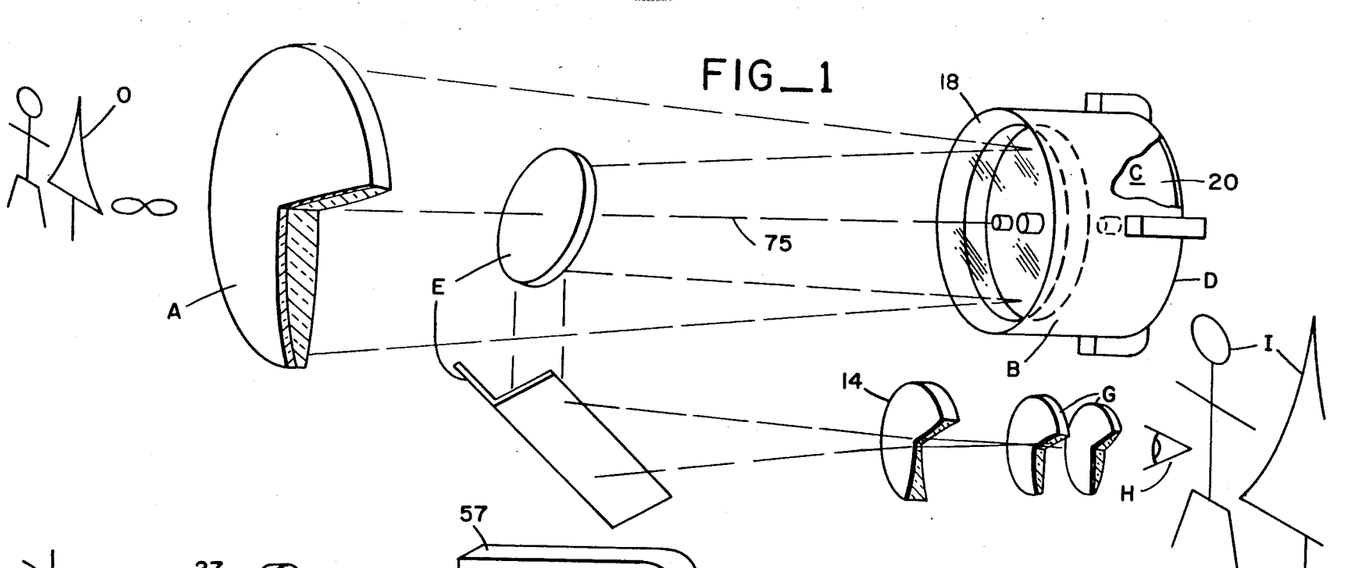
FIG. 1 is a schematic isometric view illustrating a hand held telescope of high power of magnification which can be used with this invention; the movable optical element here being shown as a mirror provided with neutral buoyant support interior of a transparent fluid bath.

With reference to FIG. 1, a typical optical stabilizer is illustrated. Briefly stated, the stabilizer is a 20 power optical train having an objective lens A mounted to focus light onto a movable optic element, here shown as mirror B. Mirror B is balanced for buoyant neutral support interior of a fluid bath C and contained interior of a chamber D. Stabilized light from mirror B is directed onto inverting mirrors E where the light is subsequently imaged at a plane F and viewed through an eyepiece G. For convenience, a negative lens 14 is shown placed in the optic path to extend the focal length of the optic path. The optics of the stabilizer will not be fully set forth. These optics are fully discussed in my copending U.S. Pat. application Ser. No. 75,965, filed Sept. 28, 1970, entitled "SEMI-ACHROMATIC STABILIZER UNIT," Pat. No. U.S. Pat. 3,711,178, issued Jan. 16, 1973.

In operation, the image stabilizer will view a distant object O, here shown schematically as the figures of a tree and a man. When viewed by the eye of an observer, an image I which is magnified by 20 power will be observed. When the instrument is subjected to accidental angular motion during such viewing, the stationary optical elements (A, E, 14 and G) and the movable optical element, mirror B, will combine to produce a stabilized image. It is the control of the movement of mirror B which is the subject matter of this invention.

Figure 2:
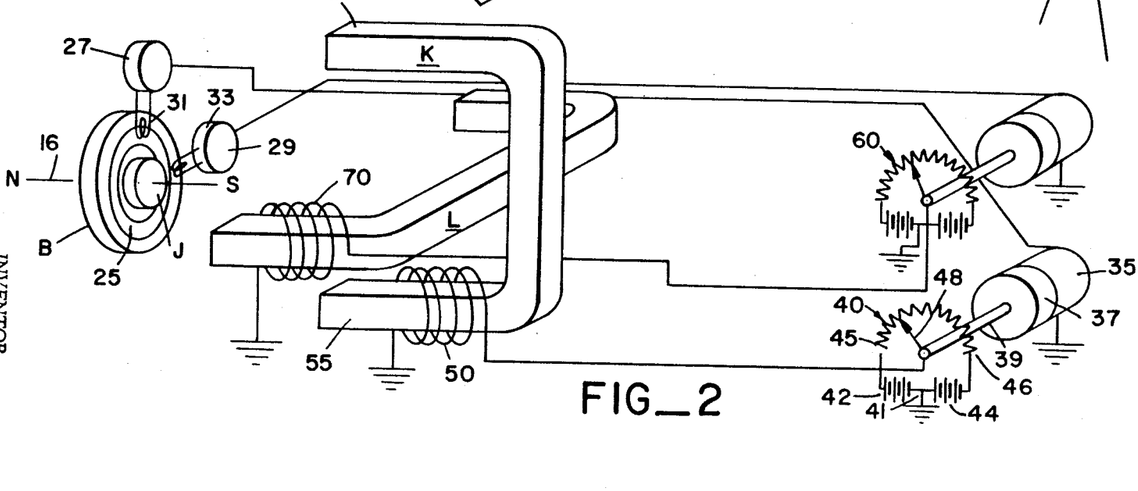
FIG. 2 is an expanded view of the rear surface of the movable optical element (mirror) of FIG. 1 with detectors for sensing the misalignment, motor driven rheostats for supplying a power output proportional to the off axis position of the mirror; and magnets for supplying to the permanently magnetized optical element a variable torque to position the element with reference to space.

Referring to FIG. 2, a control for positioning mirror B is schematically illustrated. Typically, mirror B is balanced for neutral buoyant support interior of chamber D (shown in broken lines in FIG. 2) within fluid bath C (not shown for clarity of illustration in FIG. 2). Typically, the mirror is suspended on a band 16 attached to a window 18 on the forward end of chamber D and secured to the back circular wall 20 at the rear end of chamber D.

A permanent magnet J is attached to the rear surface of mirror B. Magnet J produces a magnetic field along the axis of band 16 when mirror B is in the neutral position. As shown here the magnetic field of permanent magnet J is polarized north (N) in the direction of window 18 and south (S) in the direction of the rear circular wall 20 of chamber D.

Torque is applied to mirror B through variable magnetic fields. As here shown, a variable magnetic field emanating from a field conducting core K in the vertical axis and a field conducting core L in the horizontal axis torques mirror B by a couple to the permanent magnetic field of magnet J.

Before the control of the variable intensity magnetic field can be discussed, the detection of the off-axis movement of mirror B relative to chamber D must be illustrated. Typically the rear surface of mirror B is provided with a small, flat, metallic ring 25 concentrically mounted about the axis of band 16 as it is threaded through the mirror B. The position of this metallic ring is detected by two loaded tank circuit metal detectors 27 and 29 mounted with their detecting coils 31 and 33 interior of chamber D and within the fluid bath C.

Loaded tank circuit metal detectors 27 and 29 are oscillators which vary in their oscillating output directly proportional to the proximity of ring 25 from their respective detector coils 31, 33. These detectors are pre-referenced to emanate a voltage of a first polarity when ring 25 is remote from their respective sensing elements 31, 33, to emanate a voltage of a second polarity when ring 25 is proximate their respective coil sensors 31, 33 and to emanate no voltage when ring 25 and its attached mirror B is in a neutral position.

Loaded tank circuit metal detectors are known. Specifically, a tank circuit metal detector which can easily be modified for use with this invention is described in publication entitled "How to Build Proximity Detectors and Metal Locators" by John Potter Shields and published by Howard W. Sams & Co., Inc., of Indianapolis, Indiana, at pages 96 through 100.

As is apparent, loaded tank circuit metal detector 27 detects the deflection of mirror B in the vertical axis. Its operation to vary the magnitude and polarity of the magnetic field emanating from field conducting core K can now be set forth.

Typically, the output of detector 27 will be channeled to a direct current motor 35. Obviously when current of a first polarity is received at motor 35, rotation of motor 35 in a first direction will occur. Conversely when an electrical signal of a reversed polarity is received at motor 35, rotation of the motor in a second direction will occur.

Motor 35 is coupled through concentrically mounted reduction gearing 37 and shaft 39 to control the position of a potentiometer 40. Potentiometer 40 has an applied electrical bias. This bias emanates from a ground connection 41, a power source 42 for applying positive voltage to one end of the winding 45 of potentiometer 40, a power source 44 for applying negative voltage to the other end 46 of the winding of potentiometer 40.

Shaft 39 will position the contact 48 of potentiometer 40. Typically, when contact 48 is positioned intermediate ends 45, 46 of the winding of potentiometer 40, zero voltage will be tapped from the coil. As contact 48 moves towards end 45 of the winding of potentiometer 40, an increasingly positive voltage will be tapped from the coil. This is the position of the contact shown in FIG. 2. Conversely, when contact 48 moves towards end 46 of the winding of potentiometer 40, an increasingly negative voltage will be tapped from the coil.

The output of contact 48 is connected in series to a coil 50 wound about magnetic field conducting core K. The magnitude and direction of the current received at coil 50 will determine the magnitude and polarity of the magnetic field imparted by the core K. Core K will thus torque mirror B. This torquing will occur through the couple on the permanent magnetic field emanating from the permanent magnet J attached to the back end of the mirror.

For example, when contact 48 is in a position to tap the winding of potentiometer 40 at a position where the winding has a positive potential, core K will be polarized so that its lower arm 55 will be a north magnetic pole while its upper arm will be a south magnetic pole. Conversely, when contact 48 taps the winding of potentiometer 40 adjacent the end 46 of the coil for a negative potential, lower arm 55 of core K will be a south magnetic pole while upper arm 57 will be provided a north magnetic pole.

Dependent upon the magnitude and polarity of the magnetic field emanating from core K mirror B will have a torque applied to it. In the case where contact 48 taps the positive section of the winding of potentiometer 40, the mirror will be biased to rotate clockwise. This is to say, when viewed from the side of the instrument, the top edge of mirror B rotates toward the upper arm 57 and lower edge of mirror B rotates away from the lower arm 55. Conversely, where contact 48 taps a negative portion of the winding 45 of potentiometer 40, the mirror will be biased to rotate counterclockwise.

Just as detector 27 through motor driven potentiometer 40 and control coil 50 controls the polarity of the field emanating from core K detector 29, potentiometer 60, and coil 70 can be made to control the magnitude and polarity of a magnetic field emanating from field conducting core L. Field conducting core L will torque mirror B about a vertical axis normal to the axis of band 16 as it is threaded through mirror B.

Several observations can be made about the embodiment of the invention as it is illustrated in FIG. 2. First, it will be understood that the motor driven potentiometers 40, 60 serve only to apply an integrated torque to restore mirror B to a neutral position. This torque is generated from a time averaged position of mirror B off a neutral position. So long as mirror D has a position away from the neutral position, motor 35 and its control rheostat 40 will generate an increasing torque by field conducting core K. This torque will increase with increasing time. When the mirror returns to the neutral position, the torque will no longer increase. Its intensity will be maintained constant as of the time it returns to a neutral position, Thus, the applied torque can be said to be time averaged, the time averaging being the sum of the movement of the mirror from its neutral position times the time increment that it is away from its neutral position.

Control of the magnitude of the time integrated torque applied to mirror B can be through several expedients. For example, the output signal of the tank circuit detectors 27, 29 can be raised or lowered to control mirror torque. Additionally, the voltage applied to the windings of the potentiometers 40 or 60 can be controlled.

The reduction gearing used in driving the motor driven potentiometers 40, 60 has an advantage not immediately apparent. Typically, such gearing includes a stiction factor; a predetermined torque must be applied through the motor before any movement of the controlled contact of the motor driven potentiometer 40 or 60 occurs and the stiction of the gears is overcome. Thus, the tendency of the control mechanism of this invention to hunt on either side of the neutral position of mirror B will be damped by the stiction factor of the bearing.

The positioning of the mirror B and its attached permanent magnet J relative to the magnetic field conducting cores K and L is also important. Typically, these cores conduct the magnetic field in an arc between their respective ends. For example, if the upper arm 57 of core K is polarized north, and the lower end 55 of core K is polarized south, the north-south magnetic field will follow an arcuate path between the respective ends of the core. By positioning mirror B towards and away from the ends 55, 57 of field conducting core K, a position of mirror B will be reached where mirror B is neither urged towards or away from core K. Thus, it will be seen that although the variable magnetic fields emanating from core K can torque mirror B, it will not serve to urge mirror B along the optic axis along band 16.

It will additionally be realized that detectors 27, 29 will provide at all times a read-out of the off-axis position of mirror B relative to the fixed elements of the optical train (shown as objective lens A, inverting mirrors E, negative lens 14 and eyepiece G in FIG. 1). This signal read-out of the angular difference between a line of sight taken through the stationary optics and the mirror position can be converted to an error signal. This error signal is directly proportional to the offset of the line of sight through the optics of FIG. 1 relative to the neutral axis 75 of the optics of FIG. 1. With such an error signal the device according to this invention can be applied to gun sight and fire control applications.

Figure 3:
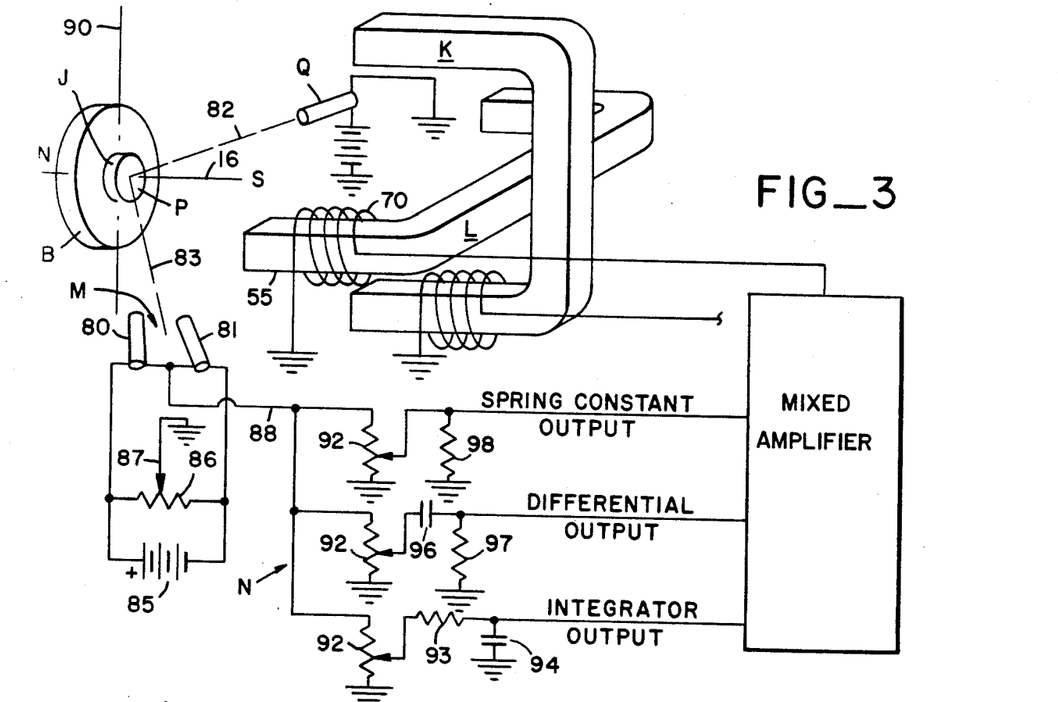
FIG. 3 is a perspective similar to FIG. 2 showing an alternate electrical control in which light is used to detect misalignment of the optical element and an electrical analog circuit is used to provide a linear spring type output, a velocity factor output and a time averaged output for control of the mirror motion.

With reference to FIG. 3 two alternate embodiments of this invention are shown. An optical sensor M is shown for sensing the off-axis position of mirror B. Additionally, analog circuitry N is shown for introducing more refined motion to mirror B through the magnetic field conducting cores K and L.

The optic sensor M will first be set forth. Mirror B is mounted in a manner precisely analogous to that shown in FIG. 2. Permanent magnet J has affixed to the obverse side of the reflecting surface of mirror B a smaller mirror P. Mirror P is typically aligned parallel to the reflecting surface of mirror B (hidden from the view in the perspective view shown in FIG. 3).

Typically, a solid state light source Q is used. Light source Q is placed and aligned in a horizontal plane intersecting the axis of the band 16 passing through mirror B. Typically, solid state light source Q is aimed to impinge its beam at an angle of approximately 45° in the center of the mirror P when the mirror assembly B is in the neutral position. It will thus be understood that the light path from the light source Q passes along a path in an imaginery horizontal plane passing through the axis of the band 16 to the mirror P.

At mirror P, the light from light source Q will be reflected at an angle of reflection which is equal and opposite to the angle of incidence of the light upon the mirror P. Typically, movement of the mirror P relative to the imaginery horizontal plane defined by the axis of band 16 in the path of light between light source Q and mirror P will produce resultant movement of the reflected ray. As will hereinafter be seen, detection of the resultant movement of the reflected ray will result in a signal proportional to the movement of mirror B angularly about the imaginery horizontal plane.

Detection of the reflected rays occurs at two photosensitive detectors 80 and 81. Detectors 80 and 81 are oriented a preselected distance apart and pointed towards the neutral position of mirror P. Typically, they are disposed within the imaginery horizontal plane including the light path between light source Q and mirror P and including the axis of band 16 as it passes through mirror assembly B. Photodetector 80 is shown to the left of the neutral and reflected light path 83 from mirror P. Photoedetector 81 is shown to th right of the neutral and reflected light path 83 from mirror P. Both detectors are converged towards mirror P at the incident location of the light path 82 from light source Q.

Detectors 80 and 81 can be of the photovoltaic or photoconductive variety. As here shown they are of the photoconductive variety.

It is most convenient if detectors 80 and 81 are placed in a bridge-type circuit. Such a circuit is illustrated and includes a power source 85, a resistor 86 connected in parallel across the power source with a grounded and adjustable center tap 87. Detector 80 is typically connected in series with the positive output of power source 85. Likewise, detector 81 is connected in series with the negative output of power source 85. Detectors 80 and 81 are directly connected to an output 88.

When mirror assembly B is in the neutral position, and detectors 80 and 81 have been positioned equidistantly on opposite sides of the reflected light path 83 from mirror P, the center tap 87 on resistor 86 is adjusted so that there is a neutral voltage potential on output 88. Once this adjustment is made, rotation of the mirror about an axis 90 perpendicular to a plane through incident light path 82 and reflected light path 83 can be easily detected.

Assuming that mirror B rotates a small amount clockwise about axis 90, it will be seen that the reflected ray 83 is deflected away from photodetector 81 and towards photodetector 80. Typically, the bridge circuit will become unbalanced. As photodetector 80 is of the photoconductive variety, it becomes less of a resistance when light is incident upon it. Typically, the voltage output 88 will be more positive.

Similarly, when mirror assembly B rotates counterclockwise about an axis 90, movement of the reflected light ray 83 away from the detector 80 and towards detector 81 will occur. The photoconductive path through detector 81 will become of low resistance and output voltage 88 will be less positive (for example a negative voltage may be emitted).

It will thus be seen that for clockwise positioning of mirror B about an axis 90 away from a neutral position will result in a more positive voltage being imparted to output 88. Conversely, a counterclockwise movement of mirror B from its neutral position will result in a less positive voltage being imparted to output 88. As will hereinafter be seen, the polarity, rate of change, and time average of this voltage will control the movement of mirror B through the analog circuitry N.

Analog circuity N can be reasily described. Output 88 is typically connected in parallel to an integrator output, a differential (or velocity) output, and a spring constant output. These are denominated as such of the schematic drawing of FIG. 3. To control the input to each of the analog circuits there is connected in each of the analog circuits a center tap resistance 92. Each of these center tap resistances 92 is connected at one end to output 88, at the opposite end to a ground connection and at the center tap to the analog circuitry. By adjustment of each center tap, the input to each analog circuit can be controlled. This individual control allows adjusement for variations in mirror buoyancy, ambient magnetic fields and the like.

The integrator analog circuitry can be easily understood. Typically, a capacitor 94 is series connected between a ground connection on one hand and the output from the center tap of the center tapped resistor 92. Voltage change of output 88 at the integrator output will be the same as that voltage received at output 88 with only the resistance of the center tapped resistor, the resistance of the charging resistor 93 and the integrating capacitor 94 effecting a change on the intensity and rate of change of the signal at the integrator output.

The differential (or velocity) analog circuitry of mirror B relative to the stationary optics can also easily be understood. Typically, the center tap of the resistor 92 is connected in series across a capacitor 96. The output of capacitor 96 is bled off to ground through a resistor 97. When a high rate of change of mirror B relative to the stationary optics occurs, a voltage will be induced by capacitor 96 across resistor 97. This differential or velocity output will be a function of the rate of change, of the size of capacitor 96, and the bleed off provided through ground connected resistor 97.

The analog spring constant is also easily understood. Assuming that a band 16 has an extremely weak spring factor, it should be noted that it is possible to generate on an analog basis a spring factor. Typically, the center tap of resistor 92 is connected to ground through a resistance 98. The value of resistance 98 as well as the adjustement of the center tap on center tap resistance 92 will provide the desired spring factor. It will be seen that this output will be directly proportional to the offset of mirror B relative to its neutral position of rotation about axis 90.

Typically, the spring constant output, the differential or velocity output, and the integrator output are all mixed and thereafter amplified. As mixers and amplifiers capable of accepting a voltage signal and generating a direct current signal of the desired polarity and intensity are well known in the art, they will not be further discussed here.

Typically, the mixer and amplifier illustrated in block form in FIG. 3 will have an output to coil 70. As heretofore explained with reference to FIG. 2 coil 70 will generate in core L a magnetic field of desired polarity and intensity. This magnetic field will apply a torque to mirror B serving to restore mirror B to a neutral position.

It will e understood that the rotation of mirror B here has been described about a vertical axis 90 through the neutral position of band 16 centering the mirror assembly B. Rotation of the mirror about a horizontal axis orthogonal to an axis through the neutral position of band 16 and axis 90 will be precisely analogous with the output of the mixer and amplifier being directed to field conducting core K. For clarity of illustration the additional detectors M required in vertical alignment orthogonal about detectors 80, 81 and appropriate analog circuitry N for these detectors have been omitted.

It should be emphasized that the integrator output, differential output and spring constant output do not necessarily combine at all instants in time to oppose mirror motion. As will be apparent to those skilled in phsycis,, they may combine to urge mirror motion in the direction of mirror motion at a given instant of time. In this way circuits can be said to complement mirror motion. physics, Moreover, due to changing instrument ambients, such as increasing or decreasing temperature, adjustment of the control circuitry responsive to the temperature change may result in velocity dependent torques not found in nature. These torques can include torques acting in the direction of the angular velocity of the movable element as well as torques moving against the angular velocity of the movable element. In this way the combined electrical and mechanical characteristics can be mixed to provide constant and predictable operating characteristics over wide variations of operating instrument ambients.

Figure 4:
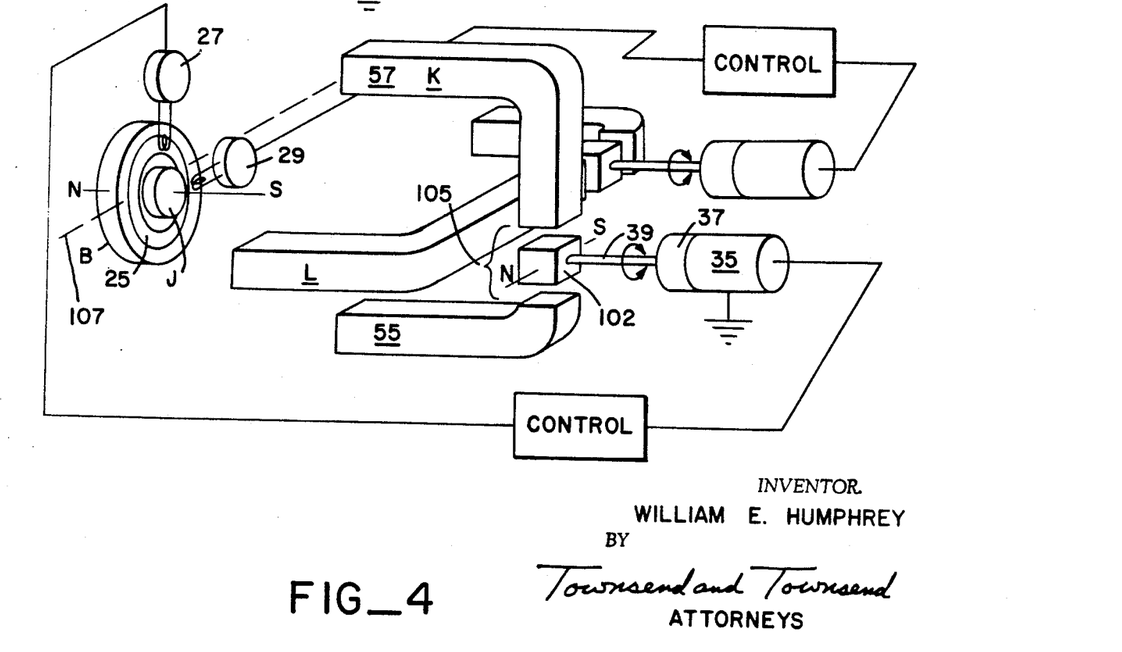
FIG. 4 is a perspective view similar to FIGS. 2 and 3 wherein the control of the magnetic fields occurs by permanent magnets interrupting the gap between a magnetic field conducting core to provide for permanent torque on the mirror without the consumption of energy.

It will be reaslized that virtually all of the mirror positioning here described requires a constant output of electrical current. With reference to FIG. 4 an apparatus is schematically illustrated in which a continuous output of current is not required for mirror positioning.

Referring to FIG. 4, a loaded tank circuit metal detector 27 is shown which is precisely analogous to that illustrated in FIG. 2. Metal detector 27 detects the proximity of a metallic ring 25 on the backside or non-reflective surface of mirror B. Assuming a deflection of mirror B occurs, the intensity and polarity of the output of detector 27 will cause rotation of a motor 35 in a direction and rate proportional to the polarity and intensity of the output signal. As previously illustrated, motor 35 through reduction gearing 37 is connected to a shaft 39 which rotates at a reduced speed.

Shaft 39 typically has connected to it a permanent north-south magnet 102. This magnet is placed within a gap 105 defined within magnetic field conducting core K.

The north-south axis of permanent magnet 102 is shown transverse of the field conducting axis of core K and this is in a neutral position as viewed in FIG. 4. Assuming that signals received from metal detector 27 indicate a need for an angular deflection of mirror assembly B clockwise about an axis 107, permanent magnet 102 will be rotated counter-clockwise. The north pole of the magnet will be disposed downwardly and towards the end 55 of the field conducting core K. Similarly the south pole of the magnet will be deflected upwardly and towards the upper end 57 of the field conducting core K. A clockwise torque will be exerted on mirror assembly B.

It should be understood that once a neutral position of mirror B has been reached, motor 35 and shaft 39 will no longer rotate. Permanent magnet 102 will remain at rest imparting to field conducting core K its permanent magnetic field. This magnetic field will be sifficient to hold mirror B in its neutral position. No electrical energy output will be required to maintain the mirror in its neutral position.

The torquing of mirror B by field conducting core L is precisely analogous. For purposes of brevity it will not herein be discussed.

Thus far, the torquing of the mirror assembly B has been illustrated with a magnetic couple between a variable magnetic field external of the moving optic element and a permanent magnetic field attached to the optic element. It should be apparent to the reader that the relative positions of these magnetic fields can be reversed. Moreover, the movement of the optic element can be urged by virtually any other known field or force. For example, in FIG. 5 a mechanical means of orienting a mirror assembly B in chamber D is disclosed.

Figure 5:
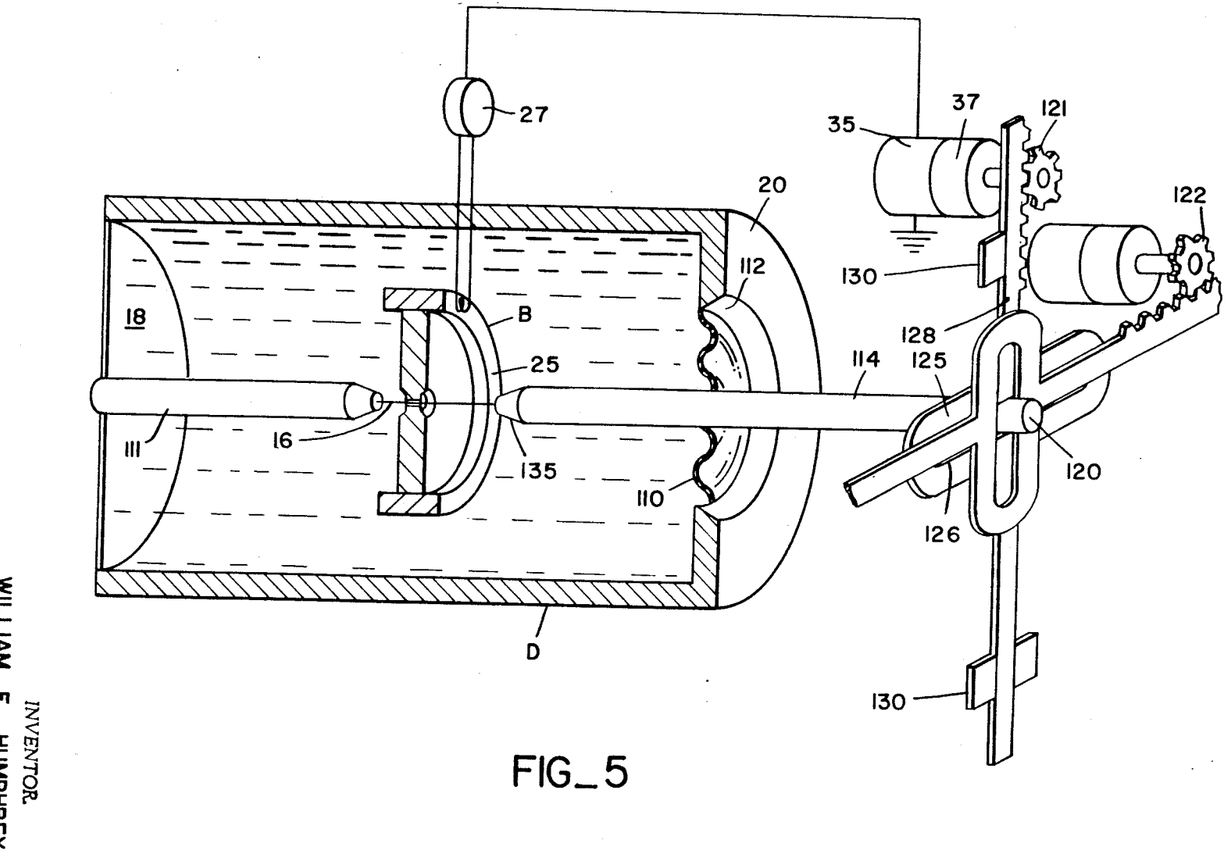
FIG. 5 is a schematic perspective view showing in partial section an apparatus for applying mechanical torque to center a movable optic element, here shown as a mirror.

With reference to FIG. 5, chamber D is shown in section filled with fluid C. A mirror centering band 16 centers mirror assembly D to a preselected position interior of the chamber. Mirror B is threaded to and affixed to a band 16 passing concentrically through the axis of the cylindrical chamber. At the forward end of the chamber band 16 is mounted to a post 111 affixed to the fluid exposed surface of window 18. At its opposite end, band 16 is fastened to a second and moving post 114.

Post 114 is mounted for movement. Typically, post 114 is captured by the center of a concentric diaphram 110. Diaphram 110 is in turn mounted to a concentric aperture 112 in rear wall 20 of chamber D.

Diaphram 110 is affixed in fluid-tight relation across the aperture 112 in chamber D, and prevents fluid flow from the interior of the chamber to the exterior of the chamber while permitting flexible movement of rod 114. Deflection of the end 120 of rod 114 remote from the interior of chamber D occurs by orthogonal rack and pinion drives 121 and 122. For purposes of brevity the vertical rack and pinion drive 121 will be the only drive discussed.

Outward end of rod 120 is typically captured interior of an elongate ring 125 having a horizontally extending aperture 126 through which end 120 of rod 114 is placed. Ring 125 is in turn rigidly mounted to rod 128 held for vertical sliding movement by guides 130 at upper end of rod 128 and at the lower end of rod 128. As is apparent limited vertical up and down movement of the rod 128 can occur and will produce a corresponding up and down movement of elongate ring 125. The elongate ring through the aperture 126 will impart a corresponding up and down movement to the end 120 of rod 114.

Naturally, it will be desired to produce a corresponding horizontal movement from horizontal rack and pinion drive 122. As can be seen slot 126 in elongate ring 125 will permit such horizontal movement while imparting to the end 120 of rod 114 the desired vertical movement.

Assuming that rod 114 at its end 120 has been deflected upwardly, this rod will tend to pivot about its concentirc attachment through the interior of diaphram 110. A corresponding downward deflection of the opposite end of the rod 135 interior of the fluid bath C will occur. When end 135 of rod 114 rotates downwardly, it will cause a clockwise torque to be imparted to mirror assembly B.

It can be immediately seen that with the detector 27 motor 35 and reduction gearing 37 previously described, the mechanical movement of mirror B can be easily urged. Moreover, the introduction of analog circuitry similar to that shown in FIG. 3 can easily be made.

The examples of inertial motion of the mirror B and of the torquing of that mirror can obviously be modified in many ways. For example, mirror B could be coupled to a gyroscope and inertial motion of the mirror urged through and by the gyroscope. In turn the motion of the gyroscope could be altered by the circuitry disclosed herein to provide the improved long term alignment properties herein described. It will be obvious to those skilled in physics that the input torques to the gyroscope will have to be orthogonally realigned to compensate for the precession characteristics of the gyrsocope used.

The dynamic performance of a stabilizer system incorporating the "Servo Integrating Stabilizer" concept bears some examination. In particular, theoretical examination of the amount of integrating that can be incorporated in the torquing system reveals that beyond a certain level of integrating contribution, the stabilizer enters into a realm of uncontrolled oscillation. This theoretical prediction has been born out in experiments with models having a variable integrating contribution to the total torque on the stabilized component. The region of acceptable operation can be predicted on the basis of a mathematical model corresponding in a reasonable degree with the performance of the actual embodiment of a servo integrating stabilizer although no manageable model is a perfect analog ot the real mechanical embodiment. For example, bearings may have small upredictable "stiction,38 electronics may saturate at certain signal levels, or fluid flow may be complicated by small local vortices. Nevertheless, these practical perturbations notwithstanding, useful limitations on the practical embodiments can be established for the gross performance of a servo integrating stabilizer.

The basic equation to consider is shown below:

$$\ddot{x} + A\dot{x} + B x + C \int x dt = f(x)$$

This is a third order differential equation relating acceleration ($\ddot{x}$) of a body whose position ($x$), is subject to acting forces proportional to velocity ($\dot{x}$), position ($x$) and position integrated over time ($\int x \, dt$). In the case of a floated mirror, $x$ would represent angular orientation of the mirror and A, B and C could be represented more specifically as follows:

$$A = k_1/I$$
$$B = k_2/I$$
$$C = k_3/I$$

where I = effective moment of inertia of mirror-fluid system.

$k_1$ = torque per velocity (viscous type drag torque from fluid, proportional to viscosity and float-to-case geometrical coupling, as well as electrically generated torques proportional to velocity).

$k_2$ = spring like restoring torque per angular position.

$k_3$ 32 torque per time integrated angular position.

$f_{(t)}$ = time varying torque inducing motion of float and including coupling of case vibrations to the mirror through the fluid and restoring forces as well as long term effects such as torques generated with change in temperature, etc.

For the purpose of the present discussion, the exact nature of $f(t)$ is not important. The solution of such a differential equation involves a particular solution describing the response to the perturbing function $f(t)$ as well as a more general homogeneous solution for the equation. This homogeneous solution is of prime importance in regard to stability of the stabilizer as it is composed essentially of exponential terms of the form:

$$x = \gamma_1 e^{\alpha_1 t} + \gamma_2 e^{\alpha_2 t} + \gamma_3 e^{\alpha_3 t},$$

, where $\alpha$ represents roots of the equation:

$$\alpha^3 + A \alpha^2 + B \alpha + C = 0$$

These roots may be complex numbers; however, the real part of $\alpha$ is of critical importance because of positive real part indicates an exponential increase with time in the motion of the stabilizing element. Therefore, all combinations of A, B and C which result in a positive real part of $\alpha$ must be excluded. Fortunately, this limitation can be expressed in the relatively simple form:

I. AB must be greater than C. in addition —

II. The coefficients, A, B and C are restricted to positive values. These conditions define a region of useful stabilizer constructions.

It should be understood that numerous modifications can be made without departing from the spirit of this invention. For example, the magnetic field conducting cores could be mounted interior of chamber D as well as exterior of chamber D. Moreover, virtually any mechanical, electrical or magnetic arrangement for introducing torques to the mirror B could be used. Examples of this would include using electrostatic fields to provide the centering force to the movable optic element. The fluid in which the mirror B is mounted could be changed or omitted in the entirety. Moreover, the mirror assembly could be gimbled and the fields produced relied upon to give the entire movement to the mirror assembly. Further, the movable optic element could be of the variety that is subjected to displacement on and off the optic axis as well as angular motion relative to the optic axis. Likewise, other modifications to this invention may be apparent to those having skill in the art.

What is claimed is:

1. In an optical stabilizer for observing an object along a light path including: a case about an optic axis; stationary optic elements mounted to said case along said optic axis; a movable optic element mounted to said case in said optic axis, said movable optic element movable responsive to inertial force to move said movable element towards and away from a neutral position with respect to said optic axis responsive to accidental angular motion of said case; said movable optic element upon being moved by said inertial force having an optic effect to produce image motion equal and opposite to image motion caused by accidental angular motion of said optic axis through said case; and means for applying a moving force to said movable optic element relative to said case for causing said movable optic element to return to said neutral position when said case receives ambient accidental angular motion, said means for applying a moving force attached to said case and coupled to said optic element; the improvement in said means for applying a moving force comprising: a sensor for detecting movement of said movable optic element from said neutral position and emitting a signal indicating said movement; means for changing said applied moving force to said movable optic element to complement movement of said movable optic element from said neutral position, said moving means including at least a first control input for increasing and decreasing said moving force applied to said movable optic element; and, control means communicated to said sensor to receive said emitted signal and having an output to the control input of said means for changing at least a portion of said moving force to said movable optic element responsive to said emitted signal.

2. The invention of claim 1 and wherein said control means changes said moving force during the period of time that said emitted signal indicating movement from said neutral position is received from said sensor.

3. The invention of claim 1 and wherein said control means has an output to said control input for changing at least a portion of said moving force proportional to said emitted signal indicating movement from said neutral position.

4. The invention of claim 1 and wherein said control means is communicated to said sensor and has an output to said control input for changing at least a portion of said moving force proportionally to the velocity of said movable optic element with respect to said case.

5. An optical stabilizer for observing an object along a light path comprising: a case about an optic axis; stationary optic elements mounted to said case along said optic axis; a movable optic element mounted to said case in said optic axis, said movable optic element movable with respect to said optic axis responsive to inertial forces to move said movable element away from a neutral position responsive to accidental angular motion of said case, said movable optic element upon being moved by said inertial forces having an optic effect to produce apparent image motion equal and opposite to image motion caused by ambient accidental vibrations being received at said case and angularly moving said fixed optic elements with respect to said optic axis; and means for providing a force coupling between said case and said movable optic element for urging movement of said movable optic element, said means for providing said coupling including means for adjustably varying at least a portion of the force of said coupling responsive to movement of said movable optic element from said neutral position.

6. The invention of claim 5 and wherein said coupling means includes a magnetic couple including a first permanent magnet and a second variable magnet with one of said magnets being attached to said movable optic element and other of said magnets being attached to said case.

7. The invention of claim 5 and wherein said means for varying the force of said coupling on said movable optic element includes a member for applying a mechanical torque to said movable optic element for urging said movable optic element to said neutral position; and means for angularly realigning said member with respect to said optic axis to change the torque on said member in a predetermined direction.

8. The invention of claim 5 and wherein said movable optic element is mounted for angular movement with respect to a point on said optic axis in two degrees of motion.

9. An optical stabilizer comprising: a case about an optical axis; at least one stationary optical element mounted to said case along said optical axis; movable optic element mounted to said case on said optic axis and movable responsive to inertial force to move said optic element towards and away from a neutral position on said optic axis, said movable optic element upon being moved by said inertial force having an optic effect to produce image motion equal and opposite to image motion caused by accidental angular motion of said optic axis through said case; and means for returning said movable optic element to said neutral position on said optic axis; said moving means including a couple to said movable optic element between first and second points on either side of said movable optic element, said couple having an input changing the force through said couple; and control means responsive to movement of said movable optic element towards and away from said neutral position communicated to said input for varying the force of said couple responsive to movement of said movable optic element off said neutral position.

10. The invention of claim 9 and wherein said couple is magnetic and includes a U-shaped magnetic field conducting core with one end of said U terminating at said first point and the other end of said U terminating at said second point, means for imparting a variable magnetic field to said U shaped magnetic field conducting core; and a permanent magnet attached to said movable optic element.

11. The invention of claim 9 and wherein said means for imparting a variable magnetic field conducting core includes a gap in said U-shaped magnetic field conducting core; a permanent magnet mounted within said gap of said U-shaped magnetic field conducting core; means for positioning said magnet to preselected orientations within said gap to impart to said magnetic field conducting core a field of varying polarity and intensity.

12. The invention of claim 9 and wherein said couple includes an eleastic member passing between said first and second points and said control means includes apparatus for changing the position of at least one of said points.

13. In an optical stabilizer for observing an object along a light path including: a case about an optic axis; stationary optic elements mounted to said case along said optic axis, a movable optic element mounted to said case along said optic axis; said movable optic element movable responsive to inertial force to move said movable element towards and away from a neutral position with respect to said optic axis responsive to accidental angular motion of said case; said movable optic element upon being moved by said inertial force having optic effect to produce apparent image motion equal and opposite to image motion caused by accidental angular motion of said optic axis through said case; and means for moving said movable optic element relative to said case for causing said movable optic element to return to said neutral position when said case receives ambient accidental angular motion, said means for moving including a detector having an input from said movable optic element; the improvement in said detecting means comprising: a surface on and mounted to said movable optic element; a transducer mounted adjacent said movable optic element for emitting a signal responsive to the relative movement between said sensor and said surface on said movable optic element.

14. The invention of claim 13 and wherein said sensor includes a loaded tank circuit metal detector and said surface includes a metallic surface.

15. The invention of claim 13 and wherein said sensor includes a light source, a photodetector and a light path therebetween; and wherein said surface includes a reflective surface disposed in said light path between said light source in said photodetector.

16. The invention of claim 15 and wherein said sensor includes at least first and second photodetectors; said first and second photodetectors positioned with respect to said light source and said light paths to a position intermediate said light path when said movable optic element is in the neutral position; bridge circuit means connected to said photodetectors for emitting first signal when said light path is intermediate said phtodetectors, emitting a second signal when said light path is more adjacent one photodetector than the other detector and emitting a third signal when said light path is more adjacent the other of said photodetectors than said one photodetector.

* * * * *